US011372720B2

(12) United States Patent
La Fetra

(10) Patent No.: US 11,372,720 B2
(45) Date of Patent: Jun. 28, 2022

(54) SYSTEMS AND METHODS FOR ENCODING METADATA

(71) Applicant: ADVANCED MICRO DEVICES, INC., Santa Clara, CA (US)

(72) Inventor: Ross Voigt La Fetra, Santa Clara, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 17/030,746

(22) Filed: Sep. 24, 2020

(65) Prior Publication Data

US 2022/0091936 A1 Mar. 24, 2022

(51) Int. Cl.
*G06F 11/00* (2006.01)
*G06F 11/10* (2006.01)

(52) U.S. Cl.
CPC .............. *G06F 11/1076* (2013.01)

(58) Field of Classification Search
None
See application file for complete search history.

(56) References Cited

U.S. PATENT DOCUMENTS

| 10,642,753 | B1* | 5/2020 | Steinberg | G06F 12/109 |
| 10,735,030 | B2* | 8/2020 | Lesartre | H03M 13/1515 |
| 2010/0169746 | A1* | 7/2010 | Karabed | G11B 20/18 |
| | | | | 714/780 |
| 2014/0095956 | A1* | 4/2014 | Ozdemir | G11C 29/42 |
| | | | | 714/755 |
| 2016/0365876 | A1* | 12/2016 | Greenspan | H03M 13/05 |
| 2019/0042369 | A1* | 2/2019 | Deutsch | G06F 21/6218 |
| 2020/0104208 | A1* | 4/2020 | Heo | G06F 3/0619 |
| 2020/0250033 | A1* | 8/2020 | Xie | G06F 12/023 |

OTHER PUBLICATIONS

Y. Wu, Y. Liu, R. Liu, H. Chen, B. Zang and H. Guan, "Comprehensive VM Protection Against Untrusted Hypervisor Through Retrofitted AMD Memory Encryption," 2018 IEEE International Symposium on High Performance Computer Architecture (HPCA), 2018, pp. 441-453, doi: 10.1109/HPCA.2018.00045. (Year: 2018).*
D. Rossi, N. Timoncini, M. Spica and C. Metra, "Error correcting code analysis for cache memory high reliability and performance," 2011 Design, Automation & Test in Europe, 2011, pp. 1-6, doi: 10.1109/DATE.2011.5763257. (Year: 2011).*

* cited by examiner

*Primary Examiner* — Daniel F. McMahon

(57) ABSTRACT

Systems and methods related to encoding metadata or other status information into error correcting code (ECC) for a data block. In one embodiment, an encoder of a memory controller generates ECC check bits based on a data block and virtual bits representing metadata, then stores the ECC check bits and the data block as a code word. Subsequently, multiple decoders of the memory controller process candidate code words that include the code word and candidate virtual bit values to detect errors in the candidate code words. The decoders output signals identifying each candidate code word as having no error, a correctable error, or an uncorrectable error and outputs a calculated error location in the case of a correctable error. The system determines the actual value of the virtual bits based on the outputs of the decoders and corrects any identified correctable error in the recovered code word.

20 Claims, 6 Drawing Sheets

SYSTEMS AND METHODS FOR ENCODING METADATA

BACKGROUND

Error correction code techniques (generally referred to as "ECC") are used for error detection and correction in applications such as digital communication and data storage. By enabling the detection and correction of errors, ECC generally supports the protection of data against otherwise undetected corruption. ECC can be implemented via block codes, which are used for data storage error detection/correction. A block code ECC is a block of redundant bits (i.e., ECC check bits) that are generated according to a specified ECC process and added to the end of a block of data of a predetermined size to detect and correct errors in the block of data. Examples of conventional block codes include Reed-Solomon, Golay, BCH, Multidimensional parity, and Hamming codes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
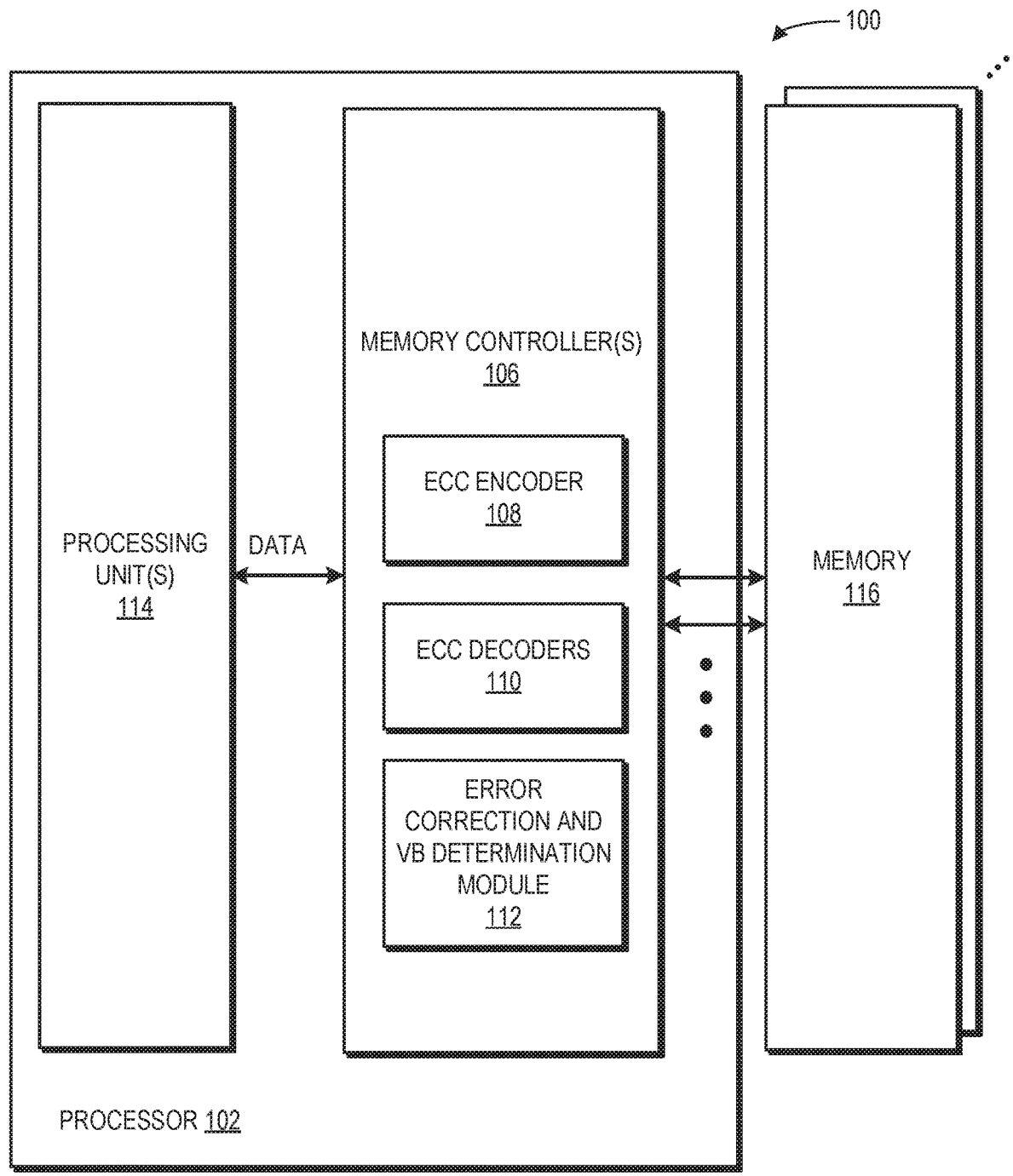
FIG. 1 is a block diagram illustrating a processing system that utilizes virtual bits encoded in ECC information to increase metadata storage capacity in accordance with some embodiments.

Conventional processing systems generally employ one or more memory modules (e.g., industry standard memory such as Dual Inline Memory Modules) having an array of memory cells, the array having only enough width for each row of memory cells to store data and check bits for implementing error correction code (ECC). However, it is often useful for a processing system to store metadata that describes one or more aspects of the data stored at the memory. For example, in some processing systems it is useful to store metadata that indicates whether given data is associated with a host operating system or is associated with a virtual machine executing at the processing system. Conventional processing systems typically lack a sufficient number of memory cells for storage of status information or other metadata associated with the data stored in that row. According to the techniques described herein, metadata describing a given block of data (sometimes referred to herein as a "data block") is provided as input to an ECC encoder of a memory controller of a processing system alongside the data block when generating ECC check bits (i.e., when performing ECC encoding for the block of data), where the ECC encoder encodes the metadata into the ECC check bits. That is, bits of metadata (i.e., metadata bits) are encoded in ECC check bits of a code word that is generated by the ECC encoder, and the non-virtual portion (e.g., data block and ECC check bits) of the code word are stored in a memory of the processing system, without storing the virtual metadata bits themselves in the memory. The values of the metadata bits are recovered during the error detection process when the data is read from the memory by determining which of a plurality of candidate values for the virtual bits results in identification of a detectable error in the read data. Thus, using the techniques described herein, the values of metadata bits are determined without storing the metadata bits themselves, improving processing efficiency without requiring increased memory for metadata storage.

As noted above, in some embodiments a processor encodes metadata bits so that the encoded metadata bits are considered "virtual bits" or "virtual metadata", as they are not stored in the memory but are only represented via ECC check bit encoding. As used herein, a "virtual bit" or "VB" refers to a bit of metadata describing one or more aspects of an associated data block or subset of data, where the associated data is stored in a memory, but where the virtual bit itself is not stored in the memory and is instead encoded in ECC check bits that are stored in the memory. By encoding metadata in ECC check bits as virtual bits, more information is represented in the memory than could otherwise be explicitly stored in the memory, thereby expanding the capabilities of the memory.

To illustrate via an example, when executing an ECC process during an access to a given set of data or "data block" (e.g., during a data read operation), processing units of the processing system generate multiple candidate code words, each candidate code word including the non-virtual bits of a code word and one or more candidate values (i.e., "candidate virtual bit values") for virtual bits encoded in ECC check bits of the stored code word. Each candidate code word is processed by respective ECC decoders of a memory controller of the processing system to identify error correction characteristics for each code word and, for instances of correctable error in a candidate code word, a corrected set of data. The processing units then select a candidate code word having a specified error correction characteristic, such as the candidate code word that corresponds to a correctable error or that is error-free. The processing units then determine that the actual values of the virtual bits of the code word are the candidate virtual bit values of the selected candidate code word. The processing units are thereby able to identify the values of metadata bits corresponding to the VBs without directly storing the metadata bits in the memory, increasing the amount of metadata available for use by the processing system without requiring increased memory space.

In various embodiments, one or more metadata bits describing a data block are received by a memory controller from a processor, and are used as inputs to an ECC encoder when generating ECC check bits for encoding the data block to which the metadata corresponds. The memory controller treats the metadata bits as part of the data block for the purpose of generating the ECC check bits. That is, the metadata is encoded in the ECC check bits during ECC encoding and are therefore represented as virtual bits in the resultant code word that includes the data, the virtual bits, and the ECC check bits. Herein, encoded data is represented as a "code word", which refers to both virtual data that is not stored in memory and non-virtual data that is stored in memory, where the data stored in memory includes a data block and ECC check bits, where the virtual metadata is encoded in the ECC check bits generated in the ECC encoding process. During decoding of a given code word, multiple candidate code words are generated and processed by respective decoders, where each code word includes a respectively unique set of candidate VB values.

When the one or more of the processing units request access to the portion of a given code word stored in memory, following encoding of that code word, the memory controller attempts to determine the value of the VB(s) (i.e., the original value of the metadata bit(s) represented by the VB(s)) encoded in the ECC check bits of the code word. For example, such VB value determination is performed when performing ECC decoding (and associated error detection and/or correction) of the code word using multiple ECC decoders. In some embodiments, for the number of VBs, M, represented in the ECC check bits, the memory controller includes $2^M$ ECC decoders, such that a respective ECC decoder is available to process each possible combination of VB values (i.e., two possible VB value combinations for one VB, four possible VB value combinations for two VBs, eight possible VB value combinations for three VBs, and so on) in parallel.

In some alternate embodiments, the variable M instead represents a number of applicable metadata states, which differ from the total number of VBs in the code word in some instances. As used herein, an "applicable metadata state" refers to a combination of VBs corresponding to a metadata state. For example, a code word containing two VBs allows for up to four metadata states to be defined: [00], [01], [10], [11]. However, for an application that only requires three metadata states to be defined, one of the four metadata states is omitted from consideration. In one such example, the metadata states corresponding to the VB value sets [00], [01], and [10] are considered "applicable metadata states" while the VB value set [11] is considered a "non-applicable metadata state", and therefore only three ECC decoders would need to be instantiated at the memory controller.

The memory controller provides candidate code words to each ECC decoder, where each candidate code word includes the data block, the ECC check bits, and a candidate value or set of values for the VB(s). In some embodiments, all possible combinations of values for the VB(s) are represented across the candidate code words provided as inputs to the ECC decoders. In some embodiments, all possible applicable metadata states are represented across the candidate code words provided as inputs to the ECC decoders. Each ECC decoder outputs an indication of whether an uncorrectable error, a correctable error, or no error is detected at that ECC for a corresponding candidate code word. If an ECC decoder identifies a correctable error in a candidate code word, the ECC decoder also generates and outputs a calculated error. For example, in some embodiments the calculated error may identifies the location and quantity of errors detected in a given code word. The calculated error identifies the location of erroneous bits or symbols in a recovered code word. Herein, a "recovered code word" refers to the code word after the non-virtual bits of the code word have been retrieved from memory, where those non-virtual bits possibly contains errors. Based on the outputs of the ECC decoders, an error correction and VB determination module of the memory controller either: identifies the candidate VB value or set of VB values corresponding to the actual value or set of values of the VBs without needing to correct errors in the recovered code word, identifies the candidate VB value or set of VB values corresponding to the actual value or set of values of the VBs and corrects identified errors in the recovered code word, or determines that the block of data contains an uncorrectable error and sends a corresponding uncorrectable error report (e.g., to a processor or operating system in communication with the memory controller).

FIG. 1 illustrates a processing system 100 that includes a processor 102 and memory 116. The processor 102 includes at least one or more memory controller(s) 106, and one or more processing units 114. The memory controllers 106 each include an ECC encoder 108, multiple ECC decoders 110, and an error correction and VB determination module 112. In some embodiments, the processing units 114 and the memory 116 are each coupled to the memory controller(s) 106. According to various embodiments, the processing system 100 supports the execution of computer instructions at an electronic device, such as a desktop computer, laptop computer, server, game console, smart phone, tablet, and the like. It should be understood that some elements of the processing system 100 are not illustrated in FIG. 1, including input-output components, interconnect fabric, hardware accelerators, additional processors, GPUs and the like, that together support the execution of computer instructions.

To support execution of computer instructions, the processor 102 is a device that is designed to execute computational operations of one or more specified types on behalf of the processing system. According to various embodiments, the processor 102 is a central processing unit (CPU), graphics processing unit (GPU), or application specific integrated circuit (ASIC). In the course of executing instructions, the processor 102 generates memory access operations (e.g., write operations and read operations) to store and retrieve data at the memory 116.

In various embodiments, the memory 116 includes one or more volatile or non-volatile memories. For example, in some embodiments each memory of the memory 116 includes one or more dynamic random-access memory (DRAM) modules, static random-access memory (SRAM) modules, non-volatile random access memory (NVRAM) modules, and/or the like. In various embodiments, the memory modules included in the memory 116 include single inline memory modules (SIMM) or dual inline memory modules (DIMM). The memory 116 stores data and instructions used by the processing units 114. In some embodiments, the memory 116 is the main memory for the processing system 100 and provides primary storage for data and instructions in execution by the processing units 114.

Access to the memory 116 by the processing units 114 is handled by the memory controller(s) 106. Generally, the memory controller(s) 106 receives data from the processing unit(s) 114 to be stored in the memory 116, then routes the data to the memory 116 for storage. To support reliable storage of data at the memory 106, the memory controller 106 implements an ECC process, wherein the memory controller 106 generates and stores an ECC code word for each block of data to be stored. To illustrate, in various embodiments, the memory controllers 106 encode data (e.g., encode each block of data) to be stored in memory (i.e., the memory 116) using ECC encoding via the ECC encoder 108

Figure 3:
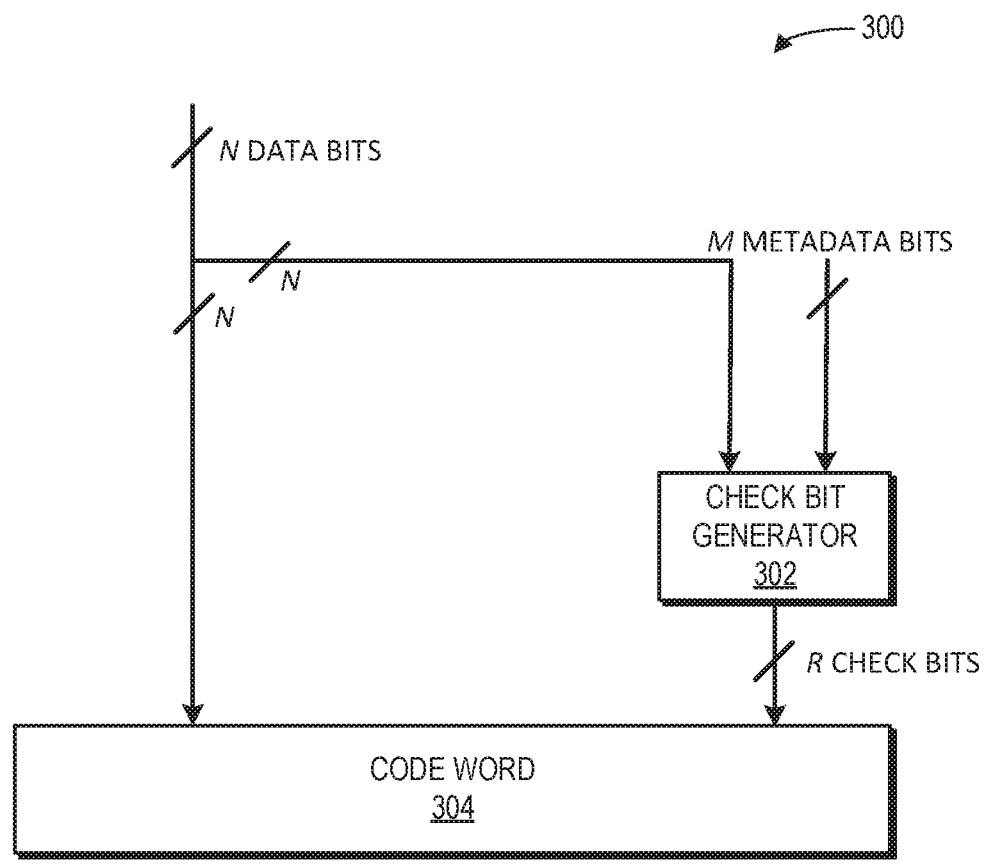
FIG. 3 is a block diagram illustrating ECC encoding by a check bit generator of an ECC encoder of the processing system of FIG. 1 in accordance with some embodiments.

(e.g., ECC encoder 300 of FIG. 3). For example, ECC encoding of data by the ECC encoder 108 and subsequent decoding by the ECC decoders 110 generally protects data stored in the memory 116 from otherwise undetected corruption. Specifically, ECC check bits generated during ECC encoding by the ECC encoder 108 are analyzed during decoding by the ECC decoders 110 to determine whether errors exist in the code word, whether such errors are correctable, and the location of such errors.

In some cases, during execution of instructions, the processor 102 generates information, referred to herein as metadata, that describes one or more aspects of data stored at the memory 116. The processor 102 utilizes the metadata to assist in processing of the corresponding data. For example, in some embodiments the processor 102 implements a virtualized computing environment, wherein the processor 102 executes a host operating system that hosts multiple virtual machines implementing guest operating systems that are also executed at the processor 102. In such a virtualized computing environment, the processor 102 utilizes metadata, referred to herein as "host metadata" to identify whether corresponding data is accessible to the host operating system. The processor 102 utilizes the host metadata to assist in processing operations such as routing data to the proper recipient, enforcement of data security between the host operating system and the virtual machines, and the like. For example, in some embodiments the host metadata includes a "guest/host bit" for the data stored at each memory address or block of memory addresses. The guest operating system is only able to access data for which a corresponding guest/host bit is "on", while the host operating system is only able to access data for which a corresponding guest/host bit is "off".

In another example, the metadata includes cache line privacy bit that represents whether a corresponding cache line is private or public, where the value of the cache line privacy bit should be recoverable from a corresponding ECC encoding. In another example, the metadata includes one or more poison bits that mark whether the corresponding data is not to be used (e.g., because the data has been identified as containing an error or having been superseded by other data) and the system should not attempt to recover the data, or is good and the system should attempt to recover the data.

In some cases, it is desirable for the processing system to maintain the value(s) of metadata for data stored at the memory 116. However, as noted above, these memory modules typically have limited storage space. Accordingly, in some embodiments, when performing ECC encoding the ECC encoder 108 generates the ECC check bits based on the data block and further based on one or more corresponding metadata bits that describe one or more aspects of the data of the data block and that are not stored in the memory. Herein, the metadata bits are considered "virtual bits" (VBs) upon being encoded in the ECC check bits without being stored in the memory 116, and are considered to be part of the resultant code word. The ECC encoder then generates a corresponding code word and stores the non-virtual bits of a code word in the memory 116, the non-virtual bits of the code word including the data block and the ECC check bits. The VB(s) of the code word are not stored.

Subsequent to ECC encoding of a given data block and corresponding metadata bits (as virtual bits) by the ECC encoder 108, the processing units 114 send an access request to the memory controller(s) 106 to request access (e.g., read access) to the address in the memory 116 at which the non-virtual portion of the code word that includes the data block is stored. In response, the memory controller(s) 106 process candidate versions of the stored portion of the code word (i.e., candidate code words) with the ECC decoders 110 (e.g., ECC decoders 401 of FIG. 4) and the error correction and VB determination module 112. The candidate code words each include the portion of the code word stored in the memory 116 that includes the data block and ECC check bits, and each further include respective candidate values for each VB that is not stored in the memory, but that is encoded in the ECC check bits.

Together, the ECC decoders 110 and the error correction and VB determination module 112 attempt to detect errors in the code word, correct detected errors, and to determine the correct value(s) of the VB(s). Each of the ECC decoders 110 processes a respective candidate code word that includes the data block, the ECC check bits generated during ECC encoding, and a candidate value or set of candidate values for the VB or set of VBs (sometimes referred herein to as "candidate VB values" or "CVB values"). To generate each candidate code word, the memory controller 106 or the ECC decoders 110 modify the recovered code word to include a unique CVB value or unique set of CVB values. Each candidate code word is then processed by a respective decoder of the ECC decoders 110 in parallel.

In some embodiments, the memory controller 106 generates candidate code words for each possible combination of CVB values. For example, for a single VB, the memory controller 106 generates two candidate code words respectively including [0, 1] as CVB values. For example, for a code word having two VBs, the memory controller 106 generates four candidate code words respectively including [(00), (01), (10), (11)] as sets of CVB values. For three VBs, the memory controller 106 generates eight candidate code words respectively including [(000), (001), (010), (011), (100), (101), (110), (111)] as sets of CVB values. In such embodiments, the number of decoders included in the ECC decoders 110 is equal to $2^M$, where M is the number of VBs in the code word.

In some embodiments, the memory controller 106 generates candidate code words for each possible combination of applicable metadata states that can be represented across the candidate code words. In such embodiments, the number of decoders included in the ECC decoders 110 is equal to $2^M$, where M is the number of applicable metadata states that can be represented by the VBs of the code word.

Each ECC decoder 110 outputs an uncorrectable error (UE) signal, a correctable error (CE) signal, or a "no error" signal to the error correction and VB determination module 112, along with the calculated error in the case of a correctable error. The calculated error output by each ECC decoder with a correctable error identifies the location(s) and corrected value(s) for one or more bit errors identified in the data. A UE signal indicates the detection of an uncorrectable error in the candidate code word (specifically in the data block and CVBs of the candidate code word) processed by a given ECC decoder 110. Such an uncorrectable error are sometimes caused by the presence of too many errors in the candidate code word, for example. A CE signal indicates a correctable error in the candidate code word (specifically in the data block and CVBs of the candidate code word) processed by a given ECC decoder 110. Such a correctable error corresponds to one or more bits having erroneous values, the locations of which are generally determinable by the ECC decoder 110 or the error correction and VB determination module 112 so that the values of those erroneous bits can be modified (e.g., by combining the calculated error with the erroneous candidate code word) to produce corrected data. A "no error" signal indicates that the ECC decoder 110 did not identify any errors in the candidate code word. If too many errors (e.g., three or more) are present in the data, the ECC will be unable to accurately detect those errors. Such cases are considered "aliasing". In the aliasing case, the corresponding ECC decoder will unpredictably output a no error, UE, or CE signal, where only the UE signal would accurately represent the state of the data.

The error correction and VB determination module 112 either determines the value of the VBs without needing to correct the recovered code word, determines the value of the VBs and corrects the recovered code word, or determines that the recovered code word includes an uncorrectable error and outputs a corresponding report/indication of the uncorrectable error. For embodiments in which a single error correcting ECC is used, if the error correction and VB determination module 112 determines that only one of the ECC decoders 110 output a "no error" signal, then the error correction and VB determination module 112 determines that the CVB value or set of CVB values of the candidate code word processed by that ECC decoder is the actual value or set of actual values of the VB or set of VBs (i.e., the original value or values of the metadata bit or bits that were encoded in to the ECC check bits of the code word). It should be understood that the terms "single error correcting ECC" and "double error correcting ECC", as used herein, are applicable to single and double error correction in the basic unit of correction for a given code. For example, for binary ECCs, the basic unit is a bit and for non-binary ECCs, the basic unit is generally a symbol. For example, a binary single error correcting ECC is capable of correcting a single bit error, whereas a non-binary single error correcting ECC, for which the basic unit is a symbol, is capable of correcting a single symbol error. For embodiments in which a single error correcting ECC is used, if the error correction and VB determination module 112 determines that only one of the ECC decoders 110 output a CE signal and the remainder of the ECC decoders 110 output respective UE signals, then the error correction and VB determination module 112 determines that the CVB value or set of CVB values of the candidate code word processed by the ECC decoder that output the CE signal is the actual value or set of actual values of the VB or set of VBs. For embodiments in which a single error correcting ECC is used, any other combination of outputs from the ECC decoders 110 results in the error correction and VB determination module 112 determining that the data block of the code word contains an uncorrectable error.

For embodiments in which multiple error correcting ECCs are used, allowing for the identification and correction of multiple errors, it is possible for multiple decoders to identify correctable errors without having experienced aliasing. In such embodiments, if the recovered code word contains a correctable error, there should still be only one decoder that detects a correctable error in which none of the detected erroneous bits are located at the location of the VBs. If such a decoder is identified, the values of the candidate virtual bits of the candidate code word processed by that decoder are identified as the actual/correct values of the VBs that were initially encoded by the ECC encoder. Otherwise, if multiple decoders indicate correctable errors in which none of the detected erroneous bits are located at the location of the virtual bits of their respective candidate code words, this indicates that aliasing has likely occurred and the system treats this scenario as though the recovered code word contains an uncorrectable error.

In response to determining that the data block contains an uncorrectable error, the error correction and VB determination module 112 outputs an indication of the uncorrectable error (e.g., to the processing units 114 or to one or more other modules within the memory controller 106). Upon determining the actual value or set of values of the VB or set of VBs, the error correction and VB determination module 112 outputs that value or set of values (e.g., to the processing units 114 or to one or more other modules within the memory controller 106) to be used as metadata for the corresponding data block. It should be understood that if one or more of the decoders 110 experiences aliasing (i.e., due to a mis-correct by the decoder), the indication reported by the error correction and VB determination module 112 will be unreliable. For example, if a single error correcting ECC is used in a code word and an error exists in the code word that needs to be corrected, each of the ECC decoders 110 except for one will show multiple errors, which is more than a single error correcting ECC is configured to handle, resulting in aliasing.

While methods of encoding of metadata via ECC is described herein with respect to DRAM, and SRAM, it should be understood that these methods are also applicable to other memory and/or data storage systems, such as hard drive disks, solid state drives, flash memory, read-only memory, registers, tape storage, caches, and/or the like.

Figure 2:
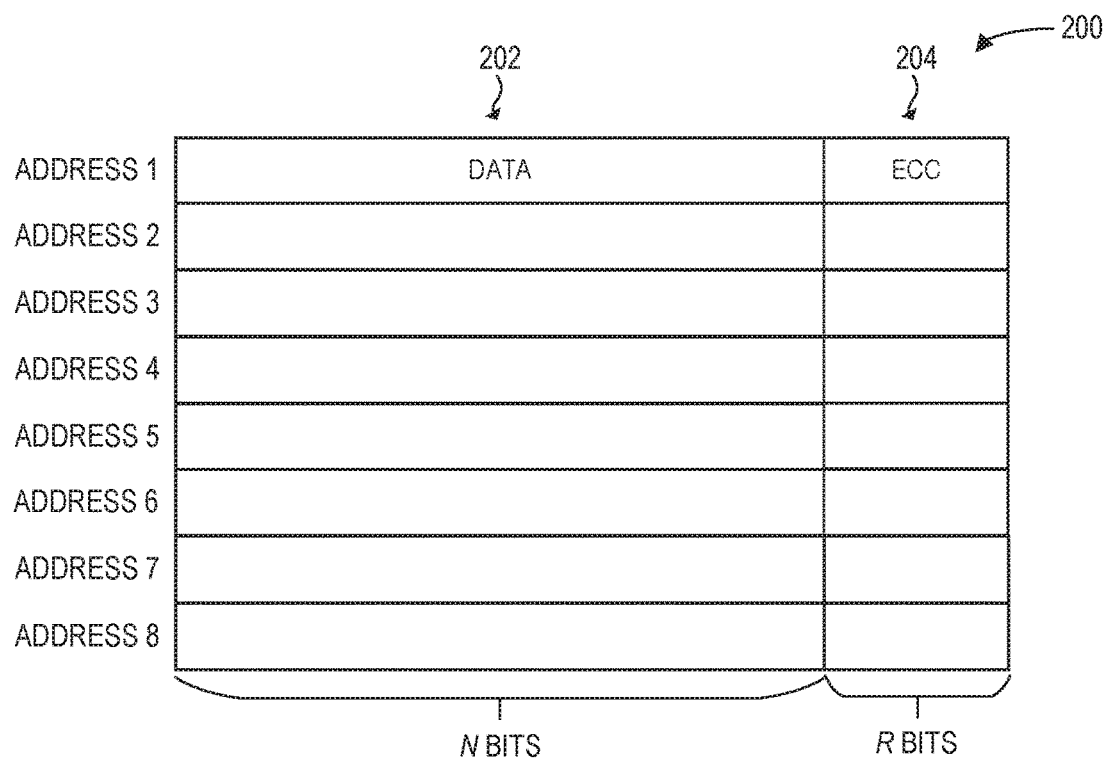
FIG. 2 is a diagram illustrating data and ECC check bits stored at various memory addresses in a memory of the processing system of FIG. 1 associated with those memory addresses in accordance with some embodiments.
Figure 2:
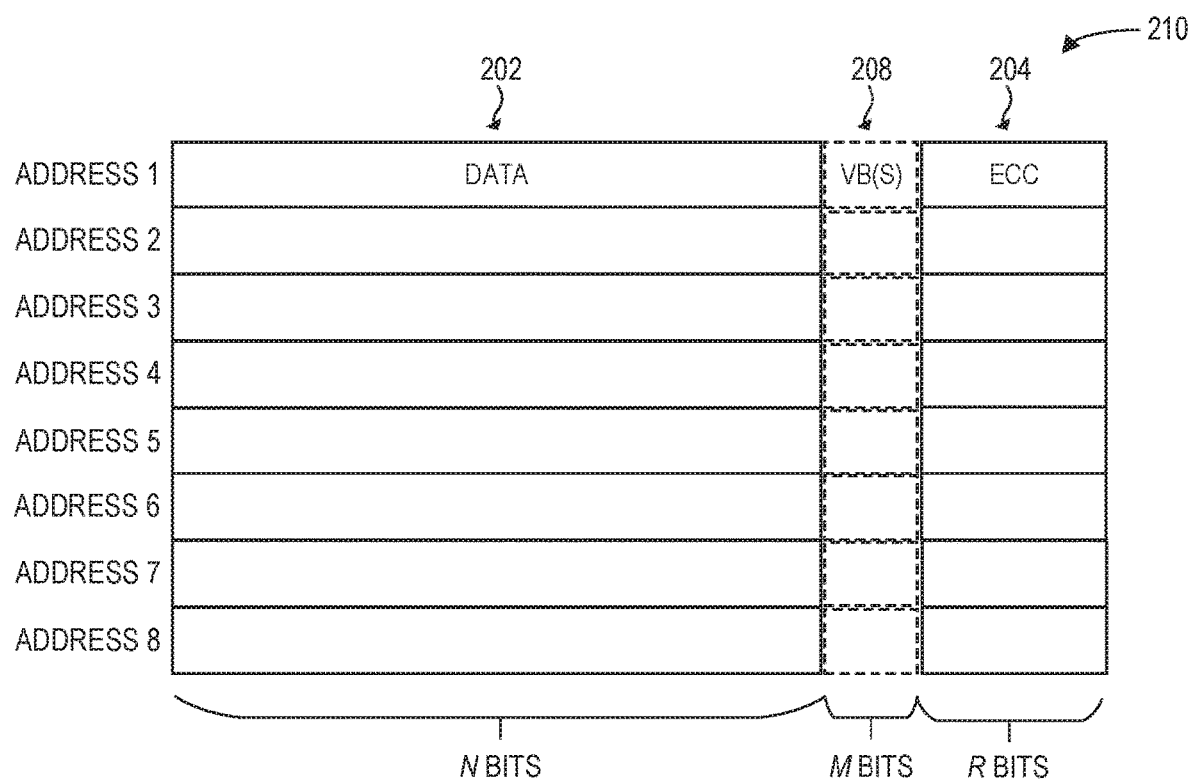

FIG. 2 shows a data set 200 illustrating code words that are physically stored at eight memory addresses of a memory, and a data set 210 illustrating, in addition to the physically stored bits of code words, the VBs that are encoded in the ECC check bits of each code word, but that are not independently stored in the memory. According to various embodiments, the data set 200 represents memory addresses of the memory 116 of FIG. 1, and the VBs are encoded into ECC check bits via the ECC encoder 108 of FIG. 1 or the ECC encoder 300 of FIG. 3.

Each code word of the data set 200 includes data (i.e., a "data block") 202 and corresponding ECC check bits 204. In the present example, each data block 202 is N bits in length, and each set of ECC check bits 204 is R bits in length. However, in various embodiments the ECC check bits 204 represent an encoding not just of a corresponding data block 202, but also of metadata represented as a set of VBs 208 that is M bits in length, as shown in the data set 210. By performing ECC encoding of both the data 202 and metadata bits corresponding to the VBs 208 when generating the ECC check bits 204 without storing the metadata bits in memory (in combination with the ECC decoding methods described herein), N+M+R bits of information can be represented using only N+R bits of the memory. Thus, in the data set 210, each code word contains a non-virtual portion that includes the data blocks 202 and the ECC check bits 204, and a virtual portion that includes the VBs 208, where the VBs of a given code word are not physically stored at the memory address corresponding to that code word.

Referring now to FIG. 3, a block diagram of an embodiment of an ECC encoder 300 is shown. In some embodiments, the ECC encoder 300 corresponds to the ECC encoder 108 of FIG. 1. The ECC encoder 300 includes a check bit generator 302 that receives N data bits corresponding to a data block to be stored in memory and receives M metadata bits that describe one or more aspects of the data block. In some embodiments, the metadata bit(s) received at the check bit generator 302 are received from one or more processing units, such as the processing units 114 of FIG. 1.

Based on these inputs, the check bit generator 302 outputs R ECC check bits, such that the metadata bit(s) are encoded in the R ECC check bits. The ECC encoder 300 does not store the metadata bits in the memory, so upon being encoded in the ECC check bits, the metadata bits are considered virtual bits. By encoding the metadata bits in the ECC check bits, the amount of information represented in the memory increases, without increasing the number of bits that are physically stored in the memory.

The ECC encoder 300 combines the N data bits and the R check bits in a code word 304 (here representative only of the non-virtual portion of the code word and excluding the metadata/VBs), which is then stored in memory (e.g., memory 116 of FIG. 1). In some embodiments, the ECC encoder 300 is configured to generate check bits from the data bits and metadata bits using a parity check matrix, and the value of each check bit output by the check bit generator 302 is obtained by an exclusive-OR (XOR) logic operation on certain selected data bits and/or metadata bits, based on the parity check matrix.

Figure 4:
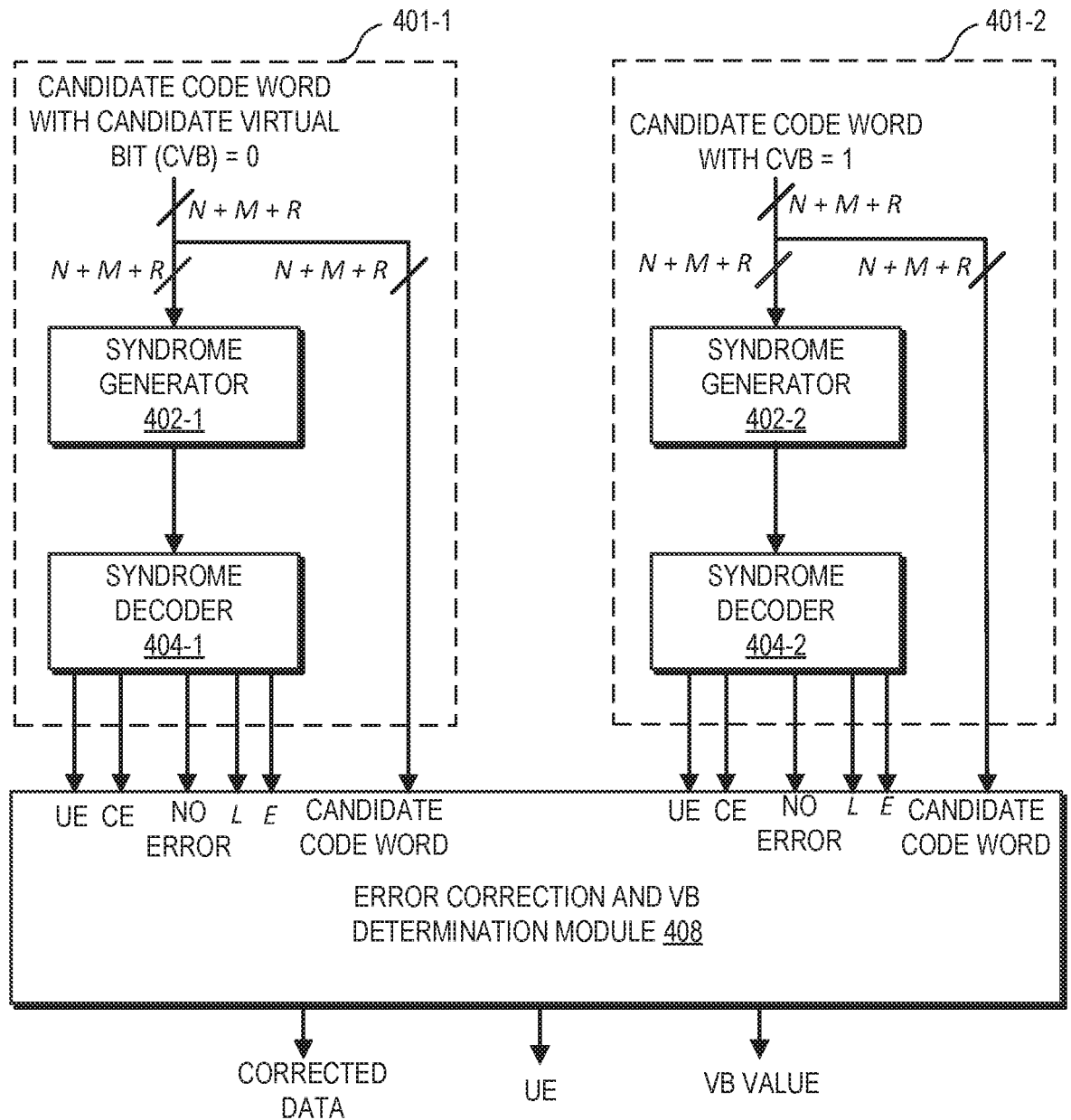
FIG. 4 is a block diagram illustrating ECC decoding, error correction, and virtual bit value determination by ECC decoders and an error correction and virtual bit determination module of the processing system of FIG. 1 in accordance with some embodiments.

Referring now to FIG. 4, a block diagram is shown, which depicts ECC decoders 401-1 and 401-2 and an error correction and VB determination module 408. In some embodiments, the ECC decoders 401-1 and 401-2 correspond to the ECC decoders 110 of FIG. 1, and the error correction and VB determination module 408 corresponds to the error correction and VB determination module 112 of FIG. 1. Each of the ECC decoders 401 is configured to receive or generate a different candidate code word, with each candidate code word including a the non-virtual portions of a recovered code word (i.e., having previously been stored in a memory following ECC encoding) that includes a data block and ECC check bits. Each candidate code word also includes a respectively unique candidate virtual bit value (CVB) or set of CVBs representing possible values for a VB or set of VBs encoded in ECC check bits of the stored portions of the code word. In some embodiments, each possible combination of values for the VB or set of VBs is represented across the CVBs of the candidate code words received by the ECC decoders 401. In some embodiments, each possible combination of applicable metadata states is represented across the CVBs of the candidate code words received by the ECC decoders 401. The present example corresponds to an embodiment in which a single VB is encoded in the ECC check bits of a code word. Thus, only two decoders are shown, with the ECC decoder 401-1 receiving a candidate code word having a candidate virtual bit (CVB) value of 0, and the ECC decoder 401-2 receiving a candidate code word having a CVB value of 1.

Each ECC decoder 401 includes a syndrome generator 402 and a syndrome decoder 404. Each ECC decoder 401 receives a candidate code word of length N+M+R, where N is the length of the data block, R is the number of ECC check bits, and M is the number of virtual bits encoded in the ECC check bits, where M=1 in the present example. Each candidate code word is generated by a memory controller (e.g., memory controller 106 of FIG. 1) that includes the ECC decoders 401 and the error correction and VB determination module 408. In some embodiments, each ECC decoder 401 share circuitry and are considered "effective decoders".

The syndrome generator 402 receives the candidate code word and generates a syndrome based on the candidate code word. The syndrome generator 402 then sends the syndrome to the syndrome decoder 404. The syndrome decoder 404 determines, based on the syndrome, whether the candidate code word contains no error, a correctable error, or an uncorrectable error. If the syndrome decoder 404 determines that the candidate code word contains no error, then it outputs a "no error" signal to the error correction and VB determination module 408. If the syndrome decoder 404 determines that the candidate code word contains a correctable error, then it determines a location of the correctable error, outputs a CE signal to the error correction and VB determination module 408, and outputs the location L and the calculated error E to the error correction and VB determination module 408. The error correction and VB determination module 408 receives the erroneous data from the data block, and corrects the error or errors therein based on the location L of any detected errors in the code word and the calculated error E received from the syndrome decoder 404, thereby producing corrected data. In some embodiments, the error correction and VB determination module 408 only calculates the corrected error for the candidate code word that is determined to include a CVB corresponding to the correct VB value.

The error correction and VB determination module 408 determines, based on the signals received from the encoders 401, the value of the virtual bit that was encoded in the ECC check bits of the code word, whether the data block contains an error, and, if so, whether an error contained in the data block is correctable. In some embodiments, the error correction and VB determination module 408 is configured to only correct a subset of the bits of the recovered code word if any bits of the subset are determined to be erroneous.

For embodiments in which the code word includes a single error correcting ECC, if the error correction and VB determination module 408 receives a "no error" signal from only one of the ECC decoders 401, then the error correction and VB determination module 408 determines that the CVB value of the candidate code word processed by that ECC decoder is the actual value of the VB. For embodiments in which the code word includes a single error correcting ECC, if the error correction and VB determination module 408 determines receives only one CE signal from the ECC decoders 401, then the error correction and VB determination module 408 determines that the value of the VB corresponds to the CVB value of the candidate code word processed by the ECC decoder that output the CE signal. For embodiments in which the code word includes a single error correcting ECC, any other combination of outputs from the ECC decoders 401 results in the error correction and VB determination module 408 determining that the data block of the code word contains an uncorrectable error.

For embodiments in which multiple error correcting ECCs are used, allowing for the identification and correction of multiple errors, it is possible for both ECC decoders 401 to identify correctable errors without having experienced aliasing (i.e., without performing a mis-correct). In such embodiments, if the recovered code word contains a correctable error, there should still be only one ECC decoder that detects a correctable error in which none of the detected erroneous bits are located at the location of the virtual bit. If such an ECC decoder is identified by the error correction and VB determination module 408, the value of the candidate virtual bit of the candidate code word processed by that ECC decoder is identified as the actual/correct value of the VB that was initially encoded by the ECC encoder. Otherwise, if both ECC decoders 401 indicate correctable errors in which none of the detected erroneous bits are located at the location of the VB, this indicates that aliasing has likely occurred and the system treats this scenario as though the recovered code word contains an uncorrectable error.

In response to determining that the data block contains an uncorrectable error, the error correction and VB determination module 408 outputs an indication of the uncorrectable error (e.g., to the processing units 114 of FIG. 1). Upon determining the actual value of the VB, the error correction and VB determination module 408 outputs that value (e.g., to the processing units 114 of FIG. 1) to be used as metadata for the corresponding data block.

While the example of FIG. 4 corresponds to the decoding of code words having ECC encoded with only a single virtual metadata bit, it should be understood that some alternate embodiments involve decoding code words having ECC encoded with more than one virtual metadata bit. For example, assuming a code word with three metadata bits encoded in the ECC: one poison bit and two state bits used to encode four states, represented here as red, green, blue, and yellow. In such an example, eight metadata states are possible: poisoned red, unpoisoned red, poisoned green, unpoisoned green, poisoned blue, unpoisoned blue, poisoned yellow, and unpoisoned yellow. Although the three metadata bits that are encoded in the ECC can yield up to 8 metadata states, only four metadata states, unpoisoned red, green, blue, and yellow, are intended to be recoverable since the system will not recover data indicated by the poison bit to be poisoned/bad, and are therefore considered "applicable metadata states". So, only four effective encoders would need to be employed in such an example, one for each applicable metadata state for which data is intended to be recoverable.

Figure 5:
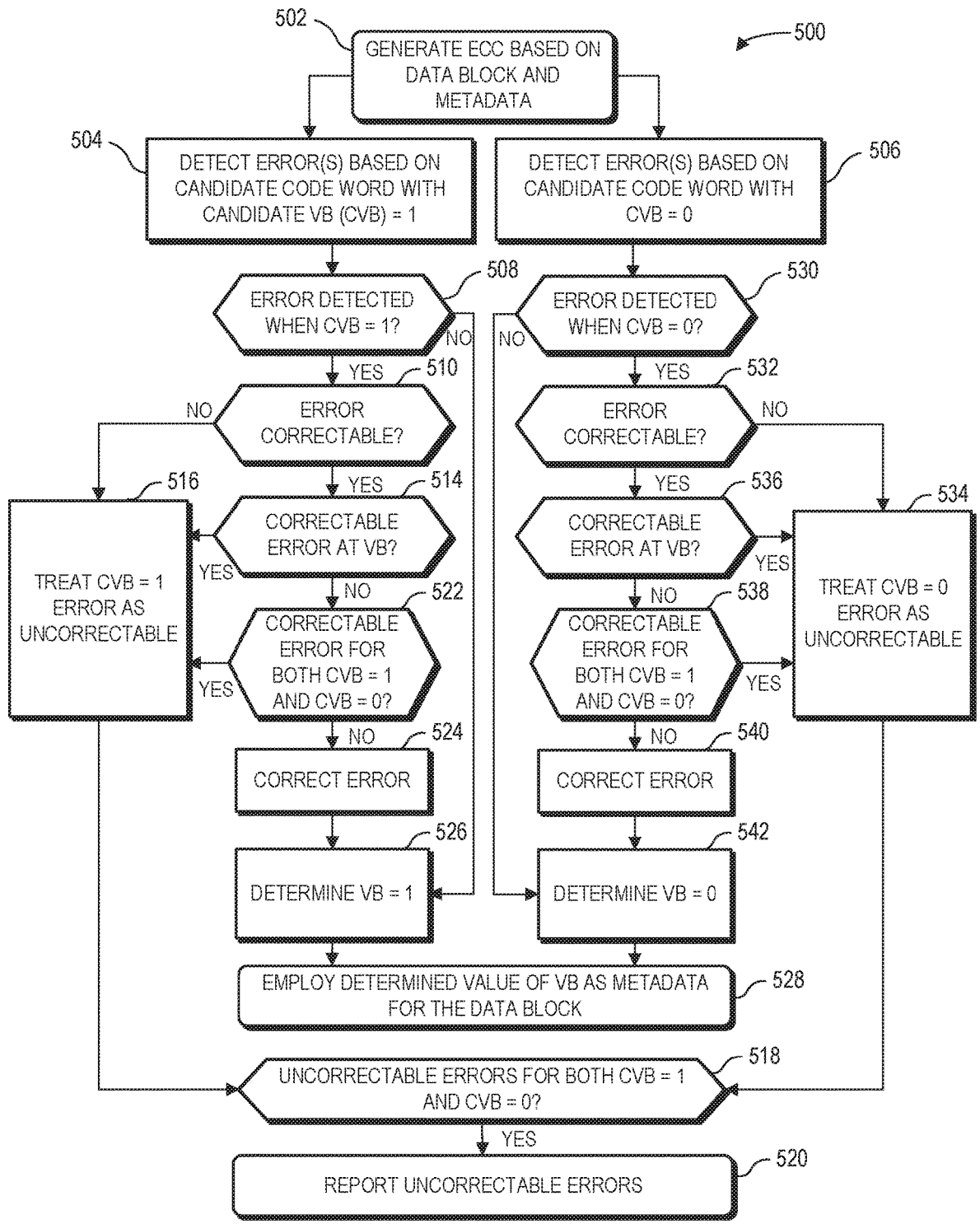
FIG. 5 is a flow diagram illustrating a method for error detection and/or correction and virtual bit value determination when a single virtual bit is encoded in the ECC, which may be performed by the processing system of FIG. 1 in accordance with some embodiments.

FIG. 5 shows an illustrative process flow for a method 500 of error detection and/or correction and VB value determination for a single encoded VB in accordance with some embodiments. The method 500 is described with respect to an example implementation at the memory controller 106 of the processor 102 of FIG. 1, and its constituent components.

At block 502, the memory controller 106 receives a data block and a metadata bit and, with the ECC encoder 108, generates ECC check bits based on the data block and the metadata bit. In some embodiments, the metadata bit describes one or more aspects of the data block, such as by indicating whether the data block corresponds to a host or guest entity. Upon being encoded in the ECC check bits, the metadata bit is considered to be a virtual bit (VB), as it is not directly stored in memory and is not otherwise retained following the encoding. In some embodiments, the memory controller receives the data block and the metadata bit to be stored in the memory 116 from the processing units 114. In some embodiments, an ECC check bit generator of the ECC encoder 108 receives the data block and the metadata bit and generates corresponding ECC check bits to generate a code word. The memory controller 106 stores the data block and the ECC check bits of the code word together at a defined address in a memory (e.g., the memory 116), without storing the metadata bit of the code word that was encoded as a virtual bit in the ECC check bits.

Blocks 504 and 506 correspond to a parallel ECC decoding process performed by the memory controller 106, and specifically by the ECC decoders 110. In an example, blocks 504 and 506 are performed responsive to a memory access request received by the memory controller 106 for the portion of the code word stored at the defined memory address. At block 504, the memory controller 106 recovers the non-virtual portions of the code word from the memory and modifies the recovered code word to include a CVB value of 1 (i.e., "high") to generate a first candidate code word. A first decoder of the ECC decoders 110 determines whether correctable or uncorrectable errors are present in the first candidate code word. If the first decoder identifies a correctable error, it sends a CE signal, and a corresponding calculated error to the error correction and VB determination module 112. If the first decoder identifies an uncorrectable error, it sends a UE signal to the error correction and VB determination module 112. If the first decoder identifies no errors, it sends a "no error" signal to the error correction and VB determination module 112.

At block 506, the memory controller 106 modifies the recovered code word to include a CVB value of 0 (i.e., "low") to generate a second candidate code word. A second decoder of the ECC decoders 110 determines whether correctable or uncorrectable errors are present in the second candidate code word. If the second decoder identifies a correctable error, it sends a CE signal and a corresponding calculated error to the error correction and VB determination module 112. If the second decoder identifies an uncorrectable error, it sends a UE signal to the error correction and VB determination module 112. If the second decoder identifies no errors, it sends a "no error" signal to the error correction and VB determination module 112.

At block 508, the error correction and VB determination module 112 determines whether an error has been detected by the first decoder in the first candidate code word corresponding to a CVB value of 1. If the error correction and VB determination module 112 determines that such an error has been detected, which in some embodiments is determined in response to receiving a "no error" signal from the first decoder that processed the first candidate code word, the method 500 proceeds to block 526. Otherwise, the method 500 proceeds to block 510.

At block 510, the error correction and VB determination module 112, in response to determining that the first candidate code word contains an error, determines whether the error in the first candidate code word is correctable. In some embodiments, the error correction and VB determination module 112 determines that the error in the first candidate code word is correctable in response to receiving a CE signal from the first decoder. In some embodiments, the error correction and VB determination module 112 determines that the error in the first candidate code word is uncorrectable in response to receiving a UE signal from the first decoder. If the error correction and VB determination module 112 determines that the error in the first candidate code word is correctable, the method 500 proceeds to block 514. Otherwise, the method 500 proceeds to block 516 at which the error correction and VB determination module 112 treats the error in the first candidate code word as being uncorrectable.

At block 514, the error correction and VB determination module 112, in response to determining that the error(s) in the first candidate code word is correctable, determines whether the error(s) in the first candidate code word occurs at the location of the virtual bit in the first candidate code word. In some embodiments, the error correction and VB determination module 112 receives a calculated error and error location indication from the first decoder, which define whether an error has occurred in the first candidate code word at the location of the VB in the first candidate code word. For example, block 514 allows the error correction and VB determination module to discard the first candidate code word if the CVB of the first candidate code word is erroneous. If the error correction and VB determination module 112 determines that an error in the first candidate code word occurs in the location of the VB, indicating that the CVB value is erroneous, the method 500 proceeds to block 516, where the error in the first candidate code word is treated as being uncorrectable. Otherwise, the method 500 proceeds to block 522.

At block 522, the error correction and VB determination module 112 determines whether a correctable error has been detected in both of the first candidate code word and the second candidate code word. In some embodiments, the VB determination module 112 determines that the first and second candidate code words contain correctable errors in response to receiving CE signals from both the first decoder and the second decoder subsequent to the performance of blocks 514 and 536. For alternate embodiments in which more than two decoders are used, it should be understood that the recovered code word is treated as having an uncorrectable error if more than one decoder outputs a CE signal, where the errors in two or more of the corresponding candidate code words do not occur in the VBs of those candidate code words. It should be understood that if a correctable error is detected at the location of the VB in the second candidate code word at block 536, the error in the second candidate code word is treated as an uncorrectable error for the purposes of block 522. If the error correction and VB determination module 112 determines that a correctable error has been detected in both the first and second candidate code words, the method 500 proceeds to block 516 at which the error in the first candidate code word is treated as being uncorrectable. Otherwise, the method 500 proceeds to block 524.

At block 524, the error correction and VB determination module 112 corrects the error in the first candidate code word. In some embodiments, the error correction and VB determination module adds the calculated error output by the first decoder to the erroneous first candidate code word in order to correct the first candidate code word, thereby producing corrected data.

At block 526, the error correction and VB determination module 112 determines that the value of VB, as originally encoded in the ECC of the code word, is equal to 1. As described above, this determination is made in response either to determining that the first candidate code word with a CVB value of 1 is error-free or in response to determining that the first candidate code word with a CVB value of 1 contains the only correctable error in which no error occurs at the location of the VB. It should be understood that, in various alternate embodiments, the order in which blocks 524 and 526 are performed is reversed, or blocks 524 and 526 are performed in parallel.

At block 528, the system utilizes the determined value of the VB as metadata for the data block contained in the recovered code word. For example, in some embodiments, the processing units 114 use the determined value of VB as metadata for the data block. For example, if the metadata represented by the VB is a guest/host bit, the processing units 114 determine whether access to the corresponding data should be prevented, depending on the identity (guest/host) of the requesting entity matches the indication of the guest/host bit.

At block 530, the error correction and VB determination module 112 determines whether an error has been detected by the second decoder in the second candidate code word corresponding to a CVB value of 0. If the error correction and VB determination module 112 determines that such an error has been detected, which in some embodiments is determined in response to receiving a "no error" signal from the second decoder that processed the second candidate code word, the method 500 proceeds to block 542. Otherwise, the method 500 proceeds to block 532.

At block 532, the error correction and VB determination module 112, in response to determining that the second candidate code word contains an error, determines whether the error in the second candidate code word is correctable. In some embodiments, the error correction and VB determination module 112 determines that the error in the second candidate code word is correctable in response to receiving a CE signal from the second decoder. In some embodiments, the error correction and VB determination module 112 determines that the error in the second candidate code word is uncorrectable in response to receiving a UE signal from the second decoder. If the error correction and VB determination module 112 determines that the error in the second candidate code word is correctable, the method 500 proceeds to block 536. Otherwise, the method 500 proceeds to block 534 at which the error correction and VB determination module 112 treats the error in the second candidate code word as being uncorrectable.

At block 536, the error correction and VB determination module 112, in response to determining that the error in the second candidate code word is correctable, determines whether the error in the second candidate code word occurs at the location of the virtual bit in the second candidate code word. In some embodiments, the error correction and VB determination module 112 receives a calculated error and error location indication from the second decoder, which define whether an error has occurred in the second candidate code word at the location of the VB in the second candidate code word. For example, block 536 allows the error correction and VB determination module to discard the second candidate code word if the CVB of the second candidate code word is erroneous. If the error correction and VB determination module 112 determines that an error in the second candidate code word occurs in the location of the VB, indicating that the CVB value is erroneous, the method 500 proceeds to block 534, where the error in the second candidate code word is treated as being uncorrectable. Otherwise, the method 500 proceeds to block 538.

At block 538, the error correction and VB determination module 112 determines whether a correctable error has been detected in both of the first candidate code word and the second candidate code word. In some embodiments, the VB determination module 112 determines that the first and second candidate code words contain correctable errors in response to receiving CE signals from both the first decoder and the second decoder subsequent to the performance of blocks 514 and 536. It should be understood that if a correctable error is detected at the location of the VB in the first candidate code word at block 514, the error in the first candidate code word is treated as an uncorrectable error for the purposes of block 538. If the error correction and VB determination module 112 determines that a correctable error has been detected in both the first and second candidate code words, the method 500 proceeds to block 534 at which the error in the second candidate code word is treated as being uncorrectable. Otherwise, the method 500 proceeds to block 540.

At block 540, the error correction and VB determination module 112 corrects the error in the second candidate code word. In some embodiments, the error correction and VB determination module adds the calculated error output by the second decoder to the erroneous second candidate code word in order to correct the second candidate code word, thereby producing corrected data.

At block 542, the error correction and VB determination module 112 determines that the value of VB, as originally encoded in the ECC of the code word, is equal to 0. As described above, this determination is made in response either to determining that the second candidate code word with a CVB value of 0 is error-free or in response to determining that the second candidate code word with a CVB value of 0 contains the only correctable error in which no error occurs at the location of the VB. It should be understood that, in various alternate embodiments, the order in which blocks 540 and 542 are performed is reversed or blocks 540 and 542 are performed in parallel.

Upon the error correction and VB determination module 112 determining that at least one of the first and second candidate code words contains an uncorrectable error, or an error that is to be treated as uncorrectable, at either of blocks 516 and 534, the method 500 proceeds to block 518. At block 518, the error correction and VB determination module 112 determines whether both of the first and second candidate code words contain uncorrectable errors. If both of the first and second candidate code words contain respective uncorrectable errors, the method 500 proceeds to block 520.

At block 520, the error correction and VB determination module 112 causes one or more uncorrectable error reports to be sent. In some embodiments, the error correction and VB determination module 112 outputs a UE signal and, responsive to the UE signal, the memory controller 106 sends an uncorrectable error report to the processing units 114. In some embodiments, the error correction and VB determination module 112 generates and sends the uncorrectable error report to the processing units 114 directly. In some embodiments, the uncorrectable error report identifies the memory module and/or the memory address of the memory 116 in which the uncorrectable error has been identified.

It should be understood that, in combination, blocks 510, 514, 516, 522, 532, 534, 536, and 538 effectively allow the error correction and VB determination module 112 to determine whether the first candidate code word or the second candidate code word contains the only correctable error that is not located at the location of the VB of the corresponding candidate code word.

Figure 6:
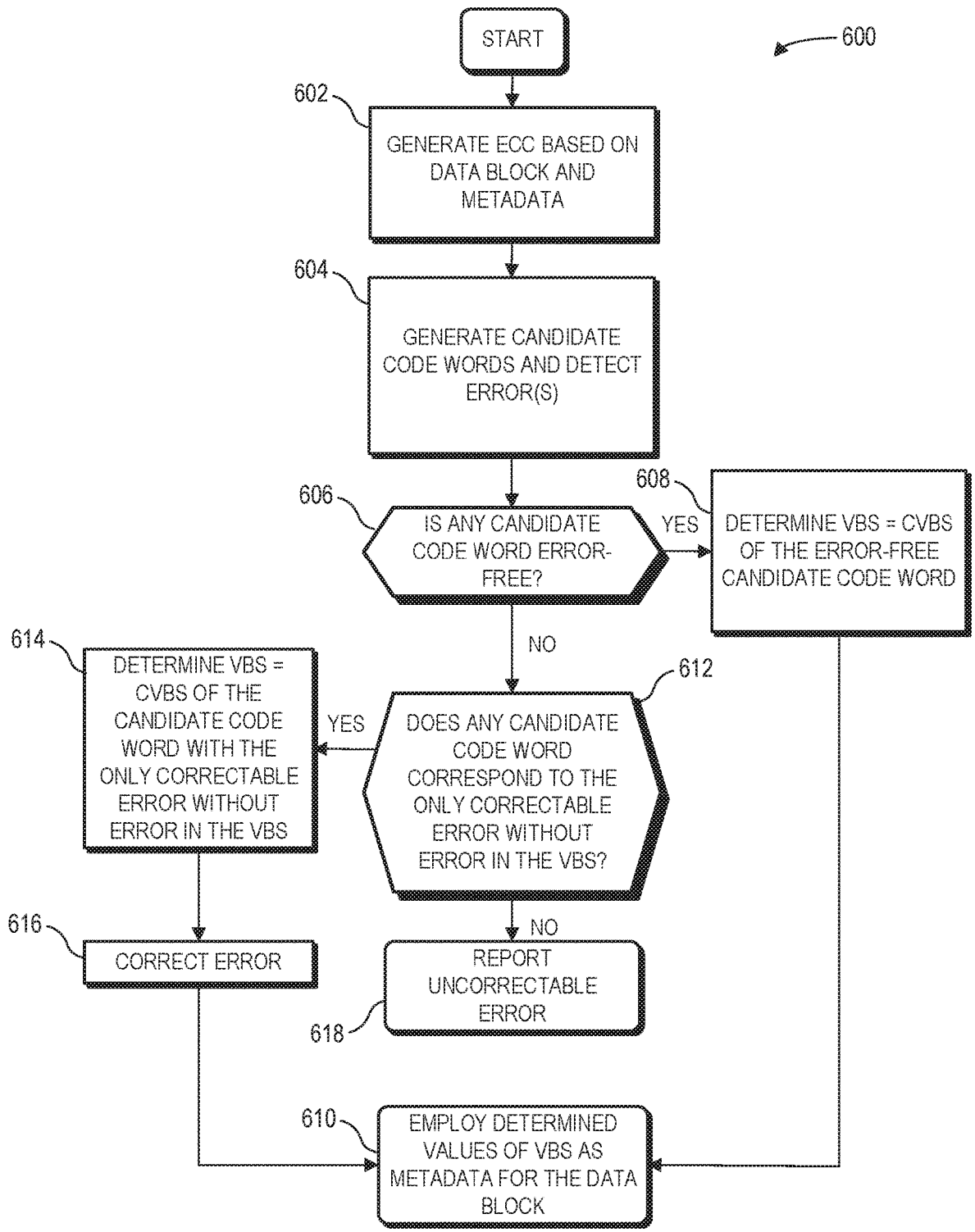
FIG. 6 is a flow diagram illustrating a method for error detection and/or correction and virtual bit value determination when multiple virtual bits are encoded in the ECC in accordance with some embodiments.

FIG. 6 shows an illustrative process flow for a method 600 of error detection and/or correction and VB value determination for a multiple encoded VBs in accordance with some embodiments. The method 600 is described with respect to an example implementation at the memory controller 106 of FIG. 1.

At block 602, the memory controller 106 receives a data block and a set of metadata bits, then generates ECC check bits based on the data block and the set of metadata bits. In some embodiments, the metadata bits describe one or more aspects of the data block, such as by indicating whether the data block corresponds to a host or guest entity. Upon being encoded in the ECC check bits, the metadata bits are considered to be a set of VBs, as they are not directly stored in memory and are not otherwise retained following the encoding. In some embodiments, the memory controller receives the data block and the metadata bits from the processing units 114. In some embodiments, an ECC check bit generator of the ECC encoder 108 receives the data block and the metadata bits and generates corresponding ECC check bits to generate a code word. The memory controller 106 stores the data block and the ECC check bits of the code word together at a defined address in the memory 116 without storing the metadata bits of the code word that were encoded as virtual bits in the ECC check bits.

At block 604, the memory controller 106 generates multiple candidate code words and attempts to detect errors in the candidate code words based on their respective ECCs. In an example, block 604 is performed responsive to a memory access request received by the memory controller 106 for the portion of the code word stored at the defined memory address. Each candidate code word includes a unique set of candidate virtual bit (CVB) values corresponding to the set of VBs. In various embodiments, ECC decoders 110 of the memory controller 106 are used to detect errors in the candidate code words.

In some embodiments, the memory controller 106 generates a respective candidate code word for each possible combination of values of the set of VBs, such that all possible CVB value combinations for the set of VBs are represented in the candidate code words generated by the memory controller 106. In such embodiments, the ECC decoders 110 includes a quantity of $2^M$ decoders, where M is the number of VBs encoded into the ECC, such that a respective decoder exists for each possible combination of VB values and, thus, for each candidate code word generated by the memory controller 106.

In some embodiments, the memory controller 106 generates a respective candidate code word for each applicable metadata state that can be represented by the VBs of the code word, such that all applicable metadata states are represented across the candidate code words generated by the memory controller 106. In such embodiments, the ECC decoders 110 includes a quantity of $2^M$ decoders, where M is the number of applicable metadata states that can be represented by the VBs encoded in the ECC, such that a respective decoder exists for each applicable metadata state and, thus, for each candidate code word generated by the memory controller 106.

In some embodiments, the ECC decoders 110 perform error detection calculations for each of the candidate code words in parallel. If a given decoder of the decoders 110, when performing error detection for a given candidate code word, determines that the candidate code word contains a correctable error, the decoder outputs a CE signal, and a corresponding calculated error. If the given decoder identifies an uncorrectable error in the candidate code word, it outputs a UE signal to the error correction and VB determination module 112. If the given decoder identifies no errors in the candidate code word, it outputs a "no error" signal to the error correction and VB determination module 112.

At block 606, the error correction and VB determination module 112 determines, based on the signals it received from the ECC decoders 110, whether any of the candidate code words are error-free. That is, the error correction and VB determination module 112 determines whether it received a "no error" signal from any of the ECC decoders at block 604. If so, the method 600 proceeds to block 608. Otherwise, the method 600 proceeds to block 612.

At block 608, the error correction and VB determination module 112 determines that the values of the set of VBs correspond to the set of CVB values of the candidate code word that the ECC decoders 110 identified (i.e., via a "no error" signal) as being error-free.

At block 610, the memory controller 106 sends the determined values for the set of VBs to the processing units 114. In some embodiments, the processing units 114 use the determined values for the set of VBs as metadata for the data block of the code word.

At block 612, the error correction and VB determination module 112 determines whether any candidate code word is indicated by the signaling received from the ECC decoders 110 as corresponding to the only correctable error that does not include an error at the locations of the VBs of the corresponding candidate code word. In some embodiments, the error correction and VB determination module 112 identifies all candidate code words for which a CE signal was received, and determines whether only one of the identified code words does not contain any errors at the locations of its VBs. If the error correction and VB determination module 112 identifies a candidate code word as corresponding to the only correctable error that does not include an error at the locations of the VBs, the method 600 proceeds to block 614. Otherwise, the method 600 proceeds to block 618.

At block 614, the error correction and VB determination module 112 determines that the values of the set of VBs correspond to the set of CVB values of the candidate code word identified at block 612 as having the only correctable error that does not include an error at the locations of the VBs from among the multiple candidate code words.

At block 616, the error correction and VB determination module 112 corrects the correctable error in the identified candidate code word. In some embodiments, the decoder that processed the identified candidate code word outputs a calculated error and location indication that identify the presence and location of the error(s) in the identified candidate code word. The error correction and VB determination module corrects any errors in the identified candidate code word by, for example, adding the calculated error to the identified candidate code word.

While the preceding examples generally involve encoding metadata information into ECC in the context of memory bit error correction, it should be understood that these systems and methods of metadata encoding in ECC and subsequent decoding and determination of metadata bit values are also usable in other applications, such as electronic communication of data. As an example, when a first device sends a data packet to a second device via electronic communication, an encoder of the first device encodes one or more bits of metadata in the ECC of the data packet as virtual bits. When the second device receives the data packet, a decoder of the second device decodes the ECC of the data packet and attempts to determine the virtual bit value(s), as described above in the methods 500 and 600 of FIGS. 5 and 6.

EXAMPLES

Various examples of error cases that occur in candidate code words processed by any of the systems and components shown in FIGS. 1, 3, and 4 and examples of how such error cases would be handled in some embodiments using either of the methods of FIGS. 5 and 6 are provided below.

The following examples correspond to code words that include single error correcting ECC capable of correcting single bit errors.

Example 1

TABLE 1

| | Single Error Correcting ECC—No Error Case | | | | | | | | | | | | | | |
|---|---|---|---|---|---|---|---|---|---|---|---|---|---|---|---|
| | Prior to Decoding | | | | | 1st Candidate | | | | | 2nd Candidate | | | | |
| | A | B | VB | C | D | A | B | VB | C | D | A | B | VB | C | D |
| Original Data | 0 | 0 | | | | | | | | | | | | | |
| Original VB | | | 0 | | | | | | | | | | | | |
| Original Code Word | 0 | 0 | 0 | 0 | 0 | | | | | | | | | | |
| Storage Error | 0 | 0 | x | 0 | 0 | | | | | | | | | | |
| Recovered Code Word | 0 | 0 | x | 0 | 0 | | | | | | | | | | |
| Candidate Code Word | | | | | | 0 | 0 | 0 | 0 | 0 | 0 | 0 | 1 | 0 | 0 |
| Syndrome | | | | | | | | 0 | 0 | | | | 3 | 2 | |
| Signal | | | | | | | No Error | | | | | CE (@VB) | | | |
| Calculated Error | | | | | | 0 | 0 | 0 | 0 | 0 | 0 | 0 | 1 | 0 | 0 |
| Recovered Code Word | | | | | | 0 | 0 | 0 | 0 | 0 | 0 | 0 | 0 | 0 | 0 |

Example 1, as illustrated in table 1, corresponds to a case in which no error is introduced to the code word during storage. Here, and in the other examples below, the original code word is set to include all zeros for the sake of simplicity. The first candidate code word includes the correct value of the original VB, 0, so no error is detected in the first candidate code word. The second candidate code word contains a single error, caused by the incorrect VB value of 1. Because the second candidate code word contains an error at the location of the VB, the error correction and VB determination module 112 of FIG. 1 discards the second candidate code word. Because the first candidate code word contains no error, the error correction and VB determination module 112 determines that the original, correct value of VB is 0 and that no error correction is needed.

Example 2

TABLE 2

Single Error Correcting ECC—Single Error Case

| | Prior to Decoding | | | | | 1st Candidate | | | | | 2nd Candidate | | | | |
|---|---|---|---|---|---|---|---|---|---|---|---|---|---|---|---|
| | A | B | VB | C | D | A | B | VB | C | D | A | B | VB | C | D |
| Original Data | 0 | 0 | | | | | | | | | | | | | |
| Original VB | | | 0 | | | | | | | | | | | | |
| Original Code Word | 0 | 0 | 0 | 0 | 0 | | | | | | | | | | |
| Storage Error | 1 | 0 | x | 0 | 0 | | | | | | | | | | |
| Recovered Code Word | 1 | 0 | x | 0 | 0 | | | | | | | | | | |
| Candidate Code Word | | | | | | 1 | 0 | 0 | 0 | 0 | 1 | 0 | 1 | 0 | 0 |
| Syndrome | | | | | | | | | 4 | 5 | | | | 7 | 7 |
| Signal | | | | | | | | CE(@A) | | | | | UE | | |
| Calculated Error | | | | | | 1 | 0 | 0 | 0 | 0 | x | x | x | x | x |
| Recovered Code Word | | | | | | 0 | 0 | 0 | 0 | 0 | x | x | x | x | x |

Example 2, as illustrated in table 2, corresponds to a case in which a single error is introduced to the code word at location A during storage, where the error does not cause aliasing to occur during error detection and decoding of the second code word. The first candidate code word includes the correct value of the original VB, 0, so only the error at location A is detected in the first candidate code word, which is considered a correctable error. The second candidate code word contains two errors, one at location A and the other at location VB caused by the incorrect VB value of 1. Because the second candidate code word contains more than one error, and the single error correcting ECC is unable to correct more than one error, the second candidate code word is determined to contain an uncorrectable error and the error correction and VB determination module 112 of FIG. 1 discards the second candidate code word. Because the first candidate code word contains a single correctable error that is not at the location of the VB, and the second candidate code word is uncorrectable, the error correction and VB determination module 112 determines that the original, correct value of VB is 0 and uses the calculated error to correct the first candidate code word, producing a corrected recovered code word of all zeros.

Example 3

TABLE 3

Single Error Correcting ECC—Single Error Case with Aliasing

| | Prior to Decoding | | | | | 1st Candidate | | | | | 2nd Candidate | | | | |
|---|---|---|---|---|---|---|---|---|---|---|---|---|---|---|---|
| | A | B | VB | C | D | A | B | VB | C | D | A | B | VB | C | D |
| Original Data | 0 | 0 | | | | | | | | | | | | | |
| Original VB | | | 0 | | | | | | | | | | | | |
| Original Code Word | 0 | 0 | 0 | 0 | 0 | | | | | | | | | | |
| Storage Error | 2 | 0 | x | 0 | 0 | | | | | | | | | | |
| Recovered Code Word | 2 | 0 | x | 0 | 0 | | | | | | | | | | |
| Candidate Code Word | | | | | | 2 | 0 | 0 | 0 | 0 | 2 | 0 | 1 | 0 | 0 |
| Syndrome | | | | | | | | | 3 | 1 | | | | 0 | 3 |
| Signal | | | | | | | | CE(@A) | | | | | CE(@D) | | |
| Calculated Error | | | | | | 2 | 0 | 0 | 0 | 0 | 0 | 0 | 0 | 0 | 3 |
| Recovered Code Word | | | | | | 0 | 0 | 0 | 0 | 0 | 2 | 0 | 1 | 0 | 3 |

Example 3, as illustrated in table 3, corresponds to a case in which an error is introduced to the code word at location A during storage, where the error causes aliasing to occur during error detection and decoding of the second candidate code word, which includes an erroneous VB value. The first and second candidate code words are both determined to include correctable errors. However, the introduction of error due to the incorrect value of VB in the second candidate code word means that the second candidate code word contains two errors. In some single error correcting ECC cases, as in Example 2, the decoder is able to determine that a given code word contains two errors and that these errors are, therefore, uncorrectable. In other single error correcting ECC cases, as in the present Example 3, two errors occurring in a given code word cause the decoder to generate an incorrect syndrome that is indicative of a single error, which is an example of aliasing. The respective values of a pair of errors and the respective locations at which those errors occur determine whether the pair of errors will cause aliasing during single error correcting ECC decoding. The total number of erroneous code word values that will cause aliasing during single error ECC decoding is dependent on the number of symbols in the erroneous code word and further dependent on the number of bits in each symbol.

Since the single error correcting ECC cannot handle errors at two locations and the errors in the second code word of Example 3 cause aliasing, the attempted error calculation results in a mis-correct, such that the calculated error indicates a single correctable error at location D and the decoder generates a corresponding CE signal, rather than generating a UE signal due to the errors at locations A and VB. Because both the first and the second candidate code words are indicated to contain different correctable errors, neither of which is indicated in the calculated errors as occurring at VB, the error correction and VB determination module 112 of FIG. 1 discards both the first and second candidate code words, and treats the recovered code word as having an uncorrectable error.

The following examples correspond to code words that include double error correcting ECC capable of correcting double bit errors.

Example 4

TABLE 4

Double Error Correcting ECC—No Error Case

| | Prior to Decoding | | | | | | | 1st Candidate | | | | | | | 2nd Candidate | | | | | |
|---|---|---|---|---|---|---|---|---|---|---|---|---|---|---|---|---|---|---|---|---|
| | A | B | VB | C | D | E | F | A | B | VB | C | D | E | F | A | B | VB | C | D | E | F |
| Original Data | 0 | 0 | | | | | | | | | | | | | | | | | | | |
| Original VB | | | 0 | | | | | | | | | | | | | | | | | | |
| Original Code Word | 0 | 0 | 0 | 0 | 0 | 0 | 0 | | | | | | | | | | | | | | |
| Storage Error | 0 | 0 | x | 0 | 0 | 0 | 0 | | | | | | | | | | | | | | |
| Recovered Code Word | 0 | 0 | x | 0 | 0 | 0 | 0 | | | | | | | | | | | | | | |
| Candidate Code Word | | | | | | | | 0 | 0 | 0 | 0 | 0 | 0 | 0 | 0 | 0 | 1 | 0 | 0 | 0 | 0 |
| Syndrome | | | | | | | | | | | 0 | 0 | 0 | 0 | | | | 4 | 7 | 7 | 5 |
| Signal | | | | | | | | | | | No Error | | | | | | | CE (@VB) | | | |
| Calculated Error | | | | | | | | 0 | 0 | 0 | 0 | 0 | 0 | 0 | 0 | 0 | 1 | 0 | 0 | 0 | 0 |
| Recovered Code Word | | | | | | | | 0 | 0 | 0 | 0 | 0 | 0 | 0 | 0 | 0 | 0 | 0 | 0 | 0 | 0 |

Example 4, as illustrated in table 4, corresponds to a case in which no error is introduced to the code word during storage. The first candidate code word includes the correct value of the original VB, 0, so no error is detected in the first candidate code word. The second candidate code word contains a single error, caused by the incorrect VB value of 1. Because the second candidate code word contains an error at the location of the VB, the error correction and VB determination module 112 of FIG. 1 discards the second candidate code word. Because the first candidate code word contains no error, the error correction and VB determination module 112 determines that the original, correct value of VB is 0 and that no error correction is needed.

Example 5

TABLE 5

Double Error Correcting ECC—Single Error Case

| | Prior to Decoding | | | | | | | 1st Candidate | | | | | | | 2nd Candidate | | | | | |
|---|---|---|---|---|---|---|---|---|---|---|---|---|---|---|---|---|---|---|---|---|
| | A | B | VB | C | D | E | F | A | B | VB | C | D | E | F | A | B | VB | C | D | E | F |
| Original Data | 0 | 0 | | | | | | | | | | | | | | | | | | | |
| Original VB | | | 0 | | | | | | | | | | | | | | | | | | |
| Original Code Word | 0 | 0 | 0 | 0 | 0 | 0 | 0 | | | | | | | | | | | | | | |
| Storage Error | 1 | 0 | x | 0 | 0 | 0 | 0 | | | | | | | | | | | | | | |
| Recovered Code Word | 1 | 0 | x | 0 | 0 | 0 | 0 | | | | | | | | | | | | | | |

TABLE 5-continued

Double Error Correcting ECC—Single Error Case

|  | Prior to Decoding | | | | | | | 1st Candidate | | | | | | | 2nd Candidate | | | | | | |
| --- | --- | --- | --- | --- | --- | --- | --- | --- | --- | --- | --- | --- | --- | --- | --- | --- | --- | --- | --- | --- | --- |
|  | A | B | VB | C | D | E | F | A | B | VB | C | D | E | F | A | B | VB | C | D | E | F |
| Candidate Code Word |  |  |  |  |  |  |  | 1 | 0 | 0 | 0 | 0 | 0 | 0 | 1 | 0 | 1 | 0 | 0 | 0 | 0 |
| Syndrome |  |  |  |  |  |  |  |  |  |  | 2 | 3 | 5 | 5 |  |  |  | 6 | 4 | 2 | 0 |
| Signal |  |  |  |  |  |  |  |  |  | CE(@A) |  |  |  |  |  |  | CE (@A and VB) |  |  |  |  |
| Calculated Error |  |  |  |  |  |  |  | 1 | 0 | 0 | 0 | 0 | 0 | 0 | 1 | 0 | 1 | 0 | 0 | 0 | 0 |
| Recovered Code Word |  |  |  |  |  |  |  | 0 | 0 | 0 | 0 | 0 | 0 | 0 | 0 | 0 | 0 | 0 | 0 | 0 | 0 |

Example 5, as illustrated in table 5, corresponds to a case in which a single error is introduced to the code word at location A during storage. The first candidate code word includes the correct value of the original VB, 0, so only the error at location A is detected in the first candidate code word, which is considered a correctable error. The second candidate code word contains two errors, one at location A and the other at location VB caused by the incorrect VB value of 1. Because the second candidate code word contains an error at the location VB, the second candidate code word is treated as though it contains an uncorrectable error and the error correction and VB determination module 112 of FIG. 1 discards the second candidate code word, even though the error in the second candidate code word would have been correctable. Because the first candidate code word contains a single correctable error that is not at the location of the VB, and the second candidate code word is treated as having an uncorrectable error, the error correction and VB determination module 112 determines that the original, correct value of VB is 0 and uses the calculated error to correct the first candidate code word, producing a corrected recovered code word of all zeros.

Example 6

TABLE 6

Double Error Correcting ECC—Double Error Case

|  | Prior to Decoding | | | | | | | 1st Candidate | | | | | | | 2nd Candidate | | | | | | |
| --- | --- | --- | --- | --- | --- | --- | --- | --- | --- | --- | --- | --- | --- | --- | --- | --- | --- | --- | --- | --- | --- |
|  | A | B | VB | C | D | E | F | A | B | VB | C | D | E | F | A | B | VB | C | D | E | F |
| Original Data | 0 | 0 |  |  |  |  |  |  |  |  |  |  |  |  |  |  |  |  |  |  |  |
| Original VB |  |  | 0 |  |  |  |  |  |  |  |  |  |  |  |  |  |  |  |  |  |  |
| Original Code Word | 0 | 0 | 0 | 0 | 0 | 0 | 0 |  |  |  |  |  |  |  |  |  |  |  |  |  |  |
| Storage Error | 3 | 1 | x | 0 | 0 | 0 | 0 |  |  |  |  |  |  |  |  |  |  |  |  |  |  |
| Recovered Code Word | 3 | 1 | x | 0 | 0 | 0 | 0 |  |  |  |  |  |  |  |  |  |  |  |  |  |  |
| Candidate Code Word |  |  |  |  |  |  |  | 3 | 1 | 0 | 0 | 0 | 0 | 0 | 3 | 1 | 1 | 0 | 0 | 0 | 0 |
| Syndrome |  |  |  |  |  |  |  |  |  |  | 7 | 3 | 0 | 6 |  |  |  | 3 | 4 | 7 | 3 |
| Signal |  |  |  |  |  |  |  |  |  | CE(@A and B) |  |  |  |  |  |  | UE |  |  |  |  |
| Calculated Error |  |  |  |  |  |  |  | 3 | 1 | 0 | 0 | 0 | 0 | 0 | x | x | x | x | x | x | x |
| Recovered Code Word |  |  |  |  |  |  |  | 0 | 0 | 0 | 0 | 0 | 0 | 0 | x | x | x | x | x | x | x |

Example 6, as illustrated in table 6, corresponds to a case in which two errors are introduced to the code word at locations A and B during storage, where the errors do not cause aliasing to occur during error detection and decoding of the second code word. The first candidate code word includes the correct value of the original VB, 0, so only the errors at locations A and B are detected in the first candidate code word, which is considered a correctable error since a double error correcting ECC is used. The second candidate code word contains three errors, one at location A, one at location B, and one at location VB caused by the incorrect VB value of 1. Because the second candidate code word contains more than two errors, the second candidate code word is determined to contain an uncorrectable error and the error correction and VB determination module 112 of FIG. 1 discards the second candidate code word. Because the first candidate code word contains only two correctable errors that are not at the location of the VB, and the second candidate code word is treated as having an uncorrectable error, the error correction and VB determination module 112 determines that the original, correct value of VB is 0 and uses the calculated error to correct the first candidate code word, producing a corrected recovered code word of all zeros.

double error ECC decoding is dependent on the number of symbols in the erroneous code word and further dependent on the number of bits in each symbol.

Since the double error correcting ECC cannot handle errors at three locations and the errors in the second code word of Example 7 cause aliasing, the attempted error calculation results in a mis-correct, such that the calculated error indicates a double correctable error at locations D and F and the decoder generates a corresponding CE signal, rather than generating a UE signal due to the errors at locations A, B, and VB. Because both the first and the second candidate code words are indicated to contain correctable errors that do not correspond to errors in their respective VB locations, neither of which is indicated in the calculated errors as occurring at VB, the error correction and VB determination module 112 of FIG. 1 discards both the first and second candidate code words, and treats the recovered code word as having an uncorrectable error.

In some embodiments, the apparatus and techniques described above are implemented in a system including one or more integrated circuit (IC) devices (also referred to as integrated circuit packages or microchips), such as the SoC described above with reference to FIG. 1. Electronic design automation (EDA) and computer aided design (CAD) software tools may be used in the design and fabrication of these IC devices. These design tools typically are represented as Example 7

TABLE 7

Double Error Correcting ECC—Double Error Case with Aliasing

| | Prior to Decoding | | | | | | | 1st Candidate | | | | | | | 2nd Candidate | | | | | | |
|---|---|---|---|---|---|---|---|---|---|---|---|---|---|---|---|---|---|---|---|---|---|
| | A | B | VB | C | D | E | F | A | B | VB | C | D | E | F | A | B | VB | C | D | E | F |
| Original Data | 0 | 0 | | | | | | | | | | | | | | | | | | | |
| Original VB | | | 0 | | | | | | | | | | | | | | | | | | |
| Original Code Word | 0 | 0 | 0 | 0 | 0 | 0 | 0 | | | | | | | | | | | | | | |
| Storage Error | 3 | 2 | x | 0 | 0 | 0 | 0 | | | | | | | | | | | | | | |
| Recovered Code Word | 3 | 2 | x | 0 | 0 | 0 | 0 | | | | | | | | | | | | | | |
| Candidate Code Word | | | | | | | | 3 | 2 | 0 | 0 | 0 | 0 | 0 | 3 | 2 | 1 | 0 | 0 | 0 | 0 |
| Syndrome | | | | | | | | | | | 4 | 2 | 7 | 0 | | | | | 0 | 5 | 0 | 5 |
| Signal | | | | | | | | CE(@A and B) | | | | | | | CE (@D and F) | | | | | | |
| Calculated Error | | | | | | | | 3 | 2 | 0 | 0 | 0 | 0 | 0 | 0 | 0 | 0 | 0 | 5 | 0 | 5 |
| Recovered Code Word | | | | | | | | 0 | 0 | 0 | 0 | 0 | 0 | 0 | 3 | 2 | 1 | 0 | 5 | 0 | 5 |

Example 7, as illustrated in table 7, corresponds to a case in which two errors are introduced to the code word at locations A and B during storage, where the errors cause aliasing to occur during error detection and decoding of the second candidate code word, which includes an erroneous VB value. The first and second candidate code words are both determined to include correctable errors. However, the introduction of error due to the incorrect value of VB in the second candidate code word means that the second candidate code word contains three errors. In some double error correcting ECC cases, as in Example 6, the decoder is able to determine that a given code word contains three errors and that these errors are, therefore, uncorrectable. In other double error correcting ECC cases, as in the present Example 7, three errors occurring in a given code word cause the decoder to generate an incorrect syndrome that is indicative of a correctable double or single error, which is an example of aliasing. The respective values of the three errors and the respective locations at which those errors occur determine whether the errors will cause aliasing during double error correcting ECC decoding. The total number of erroneous code word values that will cause aliasing during one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the processing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the processing system (e.g., system RAM or ROM), fixedly attached to the processing system (e.g., a magnetic hard drive), removably attached to the processing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating an error correction code (ECC) based on data and at least one metadata bit, wherein generating the ECC includes encoding at least one value of the at least one metadata bit into the ECC as at least one virtual bit;
performing a first error detection calculation for a first candidate code word that includes a first candidate value of the virtual bit; and
performing a second error detection calculation for a second candidate code word that includes a second candidate value of the virtual bit, the second candidate value different from the first candidate value.

2. The method of claim 1, further comprising:
discarding the at least one metadata bit after encoding the at least one value of the at least one metadata bit into the ECC.

3. The method of claim 1, wherein the at least one metadata bit comprises a first metadata bit indicative of whether a guest operating system is permitted to access the data.

4. A system comprising:
a memory controller coupled to a memory device, the memory controller comprising:
an encoder comprising first circuitry configured to:
generate an error correction code (ECC) based on data a metadata bit, wherein generating the ECC comprises encoding a value of the metadata bit into the ECC as a virtual bit, and wherein the metadata bit is not stored at the memory device; and
at least one decoder configured to determine a value of the virtual bit by decoding the ECC, the at least one decoder comprising:
second circuitry configured to perform a first error detection calculation for a first candidate code word that includes a first candidate value of the virtual bit; and
third circuitry configured to perform a second error detection calculation for a second candidate code word that includes a second candidate value of the virtual bit, the second candidate value different from the first candidate value.

5. The system of claim 4, wherein the first circuitry is further configured to discard the metadata bit after encoding the value of the metadata bit into the ECC.

6. The system of claim 4, wherein the memory controller is configured to utilize the determined value of the virtual bit as metadata for the data.

7. The system of claim 4, wherein, to determine the value of the virtual bit by decoding the ECC, the at least one decoder is configured to:
determine that the first error detection calculation for the first candidate code word indicates no error in the first candidate code word; and
responsive to determining that the first error detection calculation indicates no error in the first candidate code word, determine that the value of the virtual bit is the first candidate value.

8. The system of claim 4, wherein, to determine the value of the virtual bit by decoding the ECC, the at least one decoder is configured to:
determine that the first error detection calculation for the first candidate code word indicates a correctable error in the first candidate code word;
determine that all other error detection calculations indicate uncorrectable errors; and responsive to determining that the first error detection calculation indicates the correctable error in the first candidate code word and that the other error detection calculations indicate uncorrectable errors, determine that the value of the virtual bit is the first candidate value.

9. The system of claim 4, wherein, to determine the value of the virtual bit by decoding the ECC, the at least one decoder is configured to:
  determine that all of the error detection calculations indicate uncorrectable errors; and
  responsive to determining that all of the error detection calculations indicate uncorrectable errors, report an uncorrectable error to an operating system in communication with the memory controller.

10. The system of claim 4, wherein, to determine the value of the virtual bit by decoding the ECC, the at least one decoder is configured to:
  determine that more than one of the error detection calculations indicate correctable errors in which no error occurs at the virtual bit; and
  responsive to determining that more than one of the error detection calculations indicate correctable errors in which no error occurs at the virtual bit, report an uncorrectable error to an operating system in communication with the memory controller.

11. The system of claim 4, wherein, to determine the value of the virtual bit by decoding the ECC, the at least one decoder is configured to:
  determine that only the first error detection calculation for the first candidate code word indicates a correctable error in which no error occurs at the virtual bit;
  responsive to determining that only the first error detection calculation indicates the correctable error in which no error occurs at the virtual bit, determine that the value of the virtual bit is the first candidate value;
  generate first corrected data associated with the first error detection calculation; and
  send the first corrected data to a processor of the system.

12. A system comprising:
  at least one decoder comprising circuitry configured to determine a value of a virtual bit by decoding candidate code words using an error correction code (ECC) the at least one decoder comprising:
    a first decoder configured to perform a first error detection calculation for a first candidate code word that includes a first candidate value of the virtual bit; and
    a second decoder configured to perform a second error detection calculation for a second candidate code word that includes a second candidate value of the virtual bit, wherein the second candidate value is different from the first candidate value.

13. The system of claim 12, wherein the system is configured to utilize the determined value of the virtual bit as metadata for data included in the candidate code words.

14. The system of claim 12, wherein, to determine the value of the virtual bit, the circuitry is configured to:
  determine that the first error detection calculation indicates no errors; and
  determine, responsive to determining that the first error detection calculation indicates no errors, that the value of the virtual bit is the first candidate value.

15. The system of claim 12, wherein, to determine the value of the virtual bit, the circuitry is configured to:
  determine that the first error detection calculation indicates a correctable error;
  determine that the second error detection calculation indicates an uncorrectable error; and
  determine, responsive to determining that the first error detection calculation indicates the correctable error and the second error detection calculation indicates the uncorrectable error, that the value of the virtual bit is the first candidate value.

16. The system of claim 12, wherein, to determine the value of the virtual bit, the circuitry is configured to:
  determine that the first error detection calculation indicates a first correctable error in which no error occurs at the virtual bit;
  determine that the second error detection calculation indicates a second correctable error in which no error occurs at the virtual bit; and
  report, responsive to determining that the first error detection calculation indicates the first correctable error in which no error occurs at the virtual bit and the second error detection calculation indicates the second correctable error in which no error occurs at the virtual bit, an uncorrectable error to an operating system in communication with the system.

17. The system of claim 12, wherein, to determine the value of the virtual bit, the circuitry is configured to:
  determine that the first error detection calculation indicates a first uncorrectable error;
  determine that the second error detection calculation indicates a second uncorrectable error; and
  report, responsive to determining that the first error detection calculation indicates the first uncorrectable error and the second error detection calculation indicates the second uncorrectable error, an uncorrectable error to an operating system in communication with the system.

18. The method of claim 1, wherein the first error detection calculation is the same as the second error detection calculation.

19. The system of claim 4, wherein the first error detection calculation is the same as the second error detection calculation.

20. The system of claim 12, wherein the first error detection calculation is the same as the second error detection calculation.

* * * * *

UNITED STATES PATENT AND TRADEMARK OFFICE
CERTIFICATE OF CORRECTION

| | |
|---|---|
| PATENT NO. | : 11,372,720 B2 |
| APPLICATION NO. | : 17/030746 |
| DATED | : June 28, 2022 |
| INVENTOR(S) | : Ross Voigt La Fetra |

It is certified that error appears in the above-identified patent and that said Letters Patent is hereby corrected as shown below:

In the Claims

Column 29 Line 43, Claim 12, please insert --,-- after ")" and before "the"

Signed and Sealed this
Seventh Day of February, 2023

Katherine Kelly Vidal
*Director of the United States Patent and Trademark Office*